INVENTOR.
JOSEPH VAN ACKEREN.
BY
Stanley J. Price, Jr.
his ATTORNEY

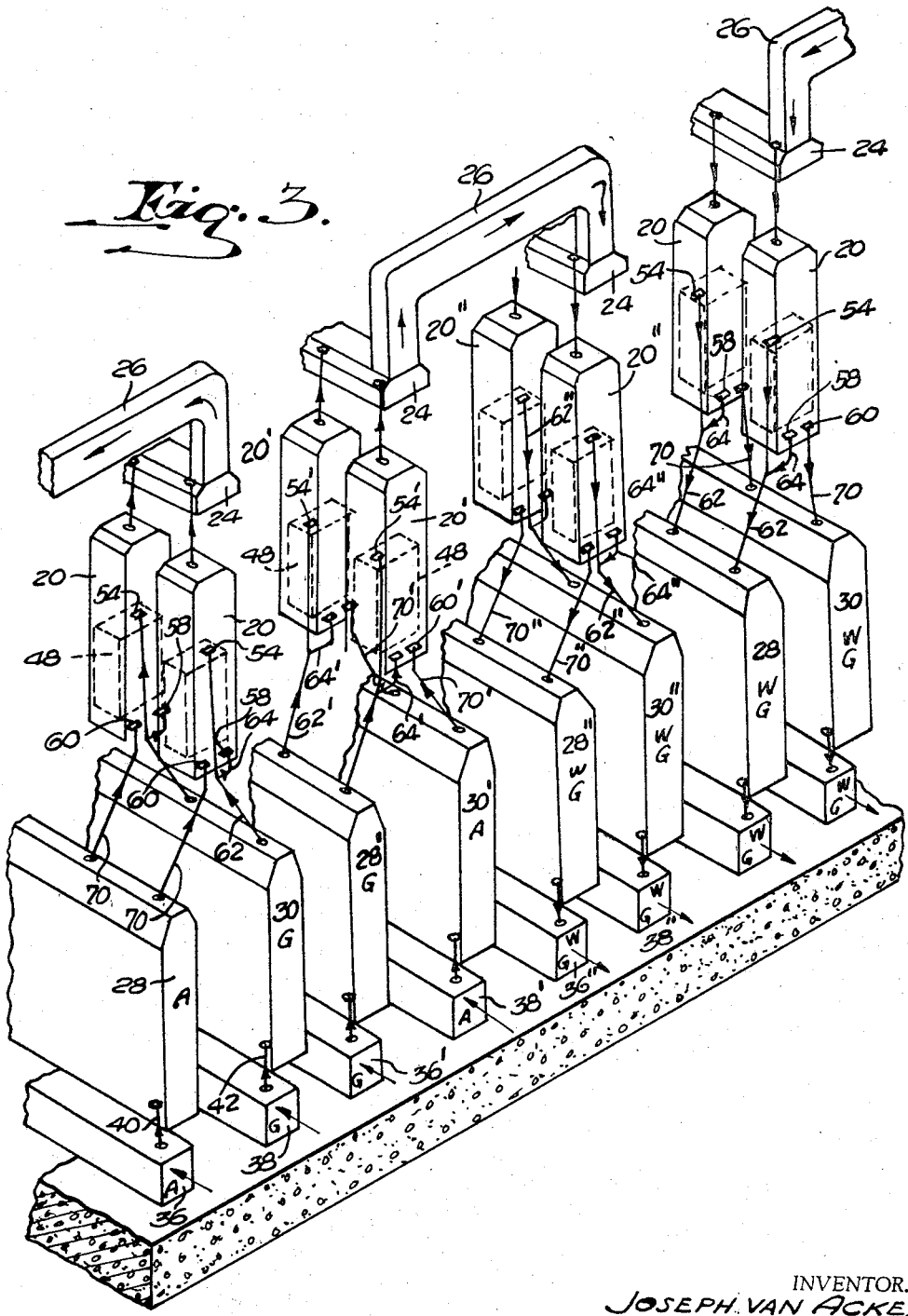

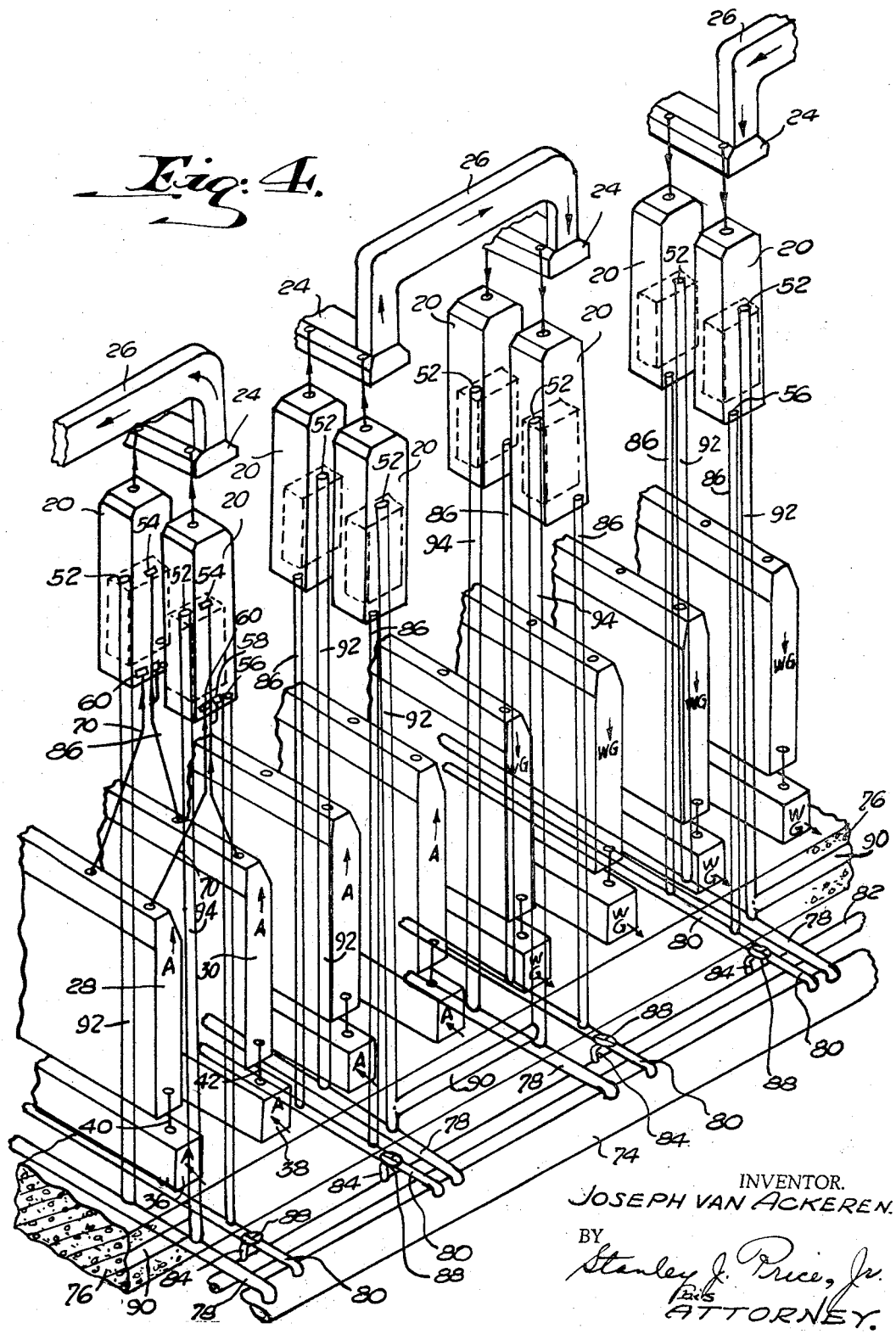

United States Patent Office 3,433,715
Patented Mar. 18, 1969

3,433,715
HEATING HIGH CHAMBERED HORIZONTAL COKE OVENS
Joseph Van Ackeren, Pittsburgh, Pa., assignor to Koppers Company, Inc., a corporation of Delaware
Filed Jan. 18, 1966, Ser. No. 521,307
U.S. Cl. 202—135
Int. Cl. C10b 21/24, 21/06
9 Claims

ABSTRACT OF THE DISCLOSURE

A high chambered coke oven having a two stage heating system arranged to burn rich fuel gas or lean fuel gas or a combination of rich fuel gas and lean fuel gas at a location adjacent the base of the flue and at an elevated location within the flue. Separate ports are provided in the base of the flue to supply air, rich fuel gas and lean fuel gas or air. Other ports are provided at an elevated location to supply rich fuel gas and lean fuel gas or air. Where lean fuel gas is the heating fuel, the lean fuel gas is supplied to a high level port and a low level port and air is supplied through a single low level port so that combustion takes place at both the base of the flue and at an elevated location within the flue. Where rich fuel gas is the heating fuel, rich fuel gas is supplied through another high level port and through another low level port. Air for combustion is supplied through the air port in the base of the flue and through the lean fuel gas high and low level ports. Where lean fuel gas is the principal fuel, metered quantities of rich fuel gas may be supplied through either of the separate rich fuel gas ports. Separate air supply means is provided for the rich fuel gas port adjacent the base of the flue for supplying air to the "off" low level port and prevent carbon accumulation.

---

This invention relates to an improved high chambered horizontal coke oven having high and low level burners, and more particularly to an improved high chambered horizontal coke oven adapted to be heated by simultaneously burning either rich gas or lean gas or both at the high level and low level burners.

In recent years the capacity of horizontal regenerative coke ovens has been increased substantially by increasing the height of the coking chambers and providing a two stage heating system in the heating flues. The two stage heating system includes high and low level gas ports which define high and low level burners in each of the vertical flues. The two stage heating system distributes the heat more uniformly than the single stage heating system used in conventional regenerative coke ovens. One of the major problems encountered in the high chambered horizontal coke ovens, that is, coke ovens having coking chambers approximately 18 to 20 feet high, is to uniformly distribute the heat from the vertical heating flues to the adjacent coking chambers. It is well known in order to obtain uniform quality coke that the entire charge of coal in the coking chamber should be heated substantially uniformly so that the entire charge of coal in the coking chamber becomes fully coked at substantially the same time and portions of the charge are not overcoked while other portions of the charge are undercoked.

It is also desirable, for versatility in operation, to heat the coke ovens with either rich gas or lean gas in the same heating flues. Rich fuel gas such as coke oven gas has a heating value of about 500 to 1000 B.t.u./c.f. and lean fuel gas such as blast furnace gas has a heating value of between 80 and 150 B.t.u./c.f. When lean gas is being used as the principal fuel, there are instances where additional heating may be desired. In such instances, it is highly desirable to provide a means for separately supplying rich fuel gas to the heating flues for combustion therein with the lean gas to provide by the auxiliary fuel the additional flue temperatures desired.

Briefly, the invention herein disclosed is directed to a high chambered coke oven structure that has all of the advantageous features of a two stage heating system and further includes means to burn either rich fuel gas or lean fuel gas, or both rich fuel gas and lean fuel gas, at the high level gas ports and the low level gas ports. The invention further includes an arrangement whereby the lean fuel gas is supplied by a common conduit from the regenerator to both the low level lean gas port and the high level lean gas port. Means are included to control the quantity of lean gas supplied through the respective high and low level gas ports. The invention also includes separate conduits for supplying rich fuel gas to the rich fuel gas high level gas port and the rich fuel gas low level gas port from a source of rich gas positioned beneath the heating chambers. Control means are provided to regulate and control the flow of rich gas to the rich gas high level gas port and to the rich gas low level gas port. With this arrangement while lean gas is being burned at both the low level lean gas port and the high level lean gas port, rich gas may be supplied to either or both the low level rich gas port and/or the high level rich gas port at a controlled rate to provide the additional flue temperatures desired. There is thus provided by the herein disclosed invention a high chambered coke oven structure with a two stage heating system that may burn either lean fuel gas or rich fuel gas simultaneously at the high level burners and the low level burners, and also supply rich fuel gas as an auxiliary fuel to the respective rich gas burners and controllably increase the flue temperatures where desired.

Accordingly, the principal feature of this invention is to provide an improved high chambered coke oven structure that has a two stage heating system in which either rich fuel gas or lean fuel gas may be burned simultaneously at both stages.

Another feature of this invention is to provide an improved high chambered coke oven structure that has a two stage heating system in which supplemental rich fuel gas may be supplied through separate high and low level burners while lean fuel gas is burned as the principal fuel.

These and other features of the invention will be more completely disclosed and described in the following specification, the accompanying drawings and the appended claims.

In the drawings:
FIGURE 1 is a fragmentary vertical section in elevation taken crosswise of a coke oven battery embodying the present invention. The portion of the coke oven battery on the left side of the figure is intended to illustrate the conduits for supplying the lean fuel gas to the lean fuel gas high and low level gas ports from the regenerator positioned therebelow. The fragmentary section on the right side of the figure illustrates the separate conduits for supplying the rich fuel gas to the low level rich fuel gas port and the high level rich fuel gas port.

FIGURE 2 is a composite section taken longitudinally through the coke oven battery illustrated in FIGURE 1. Section A—A is taken along the line A—A in FIGURE 1 and illustrates the conduits or riser passages connecting the regenerators with the heating flues to supply air and lean fuel gas to the respective flues. Section B—B is taken along the line B—B in FIGURE 1 and illustrates the supply conduits for the rich fuel gas positioned beneath the coke oven floor and the vertical conduits extending upwardly from the supply conduits to the respective low level rich gas port and the high level rich gas port.

FIGURE 3 is a schematic perspective view of heating flues and the regenerators positioned therebelow with the conduits or riser passages connecting certain of the regenerators with the low level and high level lean gas ports and other conduits connecting other regenerators with the air ports in the respective heating chambers.

FIGURE 4 is a view similar to FIGURE 3 illustrating the vertical conduits connecting the rich fuel gas supply conduits with the respective low level rich fuel gas port and high level rich fuel gas port in the vertical heating flues.

The invention is hereinafter described in conjunction with a high chambered horizontal coke oven battery of the well-known Becker crossover type disclosed in U.S. Patent No. 2,100,762. It should be understood, however, that the present improvements are not restricted to coke ovens of the type therein described, and the benefits of the present improvements may be realized in coke ovens of other types. The invention is further described in conjunction with the so-called underjet type coke oven batteries wherein the rich fuel gas is supplied through horizontal headers or conduits positioned beneath the regenerators. It should be understood that certain features of this invention may be employed with other types of gaseous fuel supply means and the benefits of the herein disclosed improvements realized therein.

Figure 1:
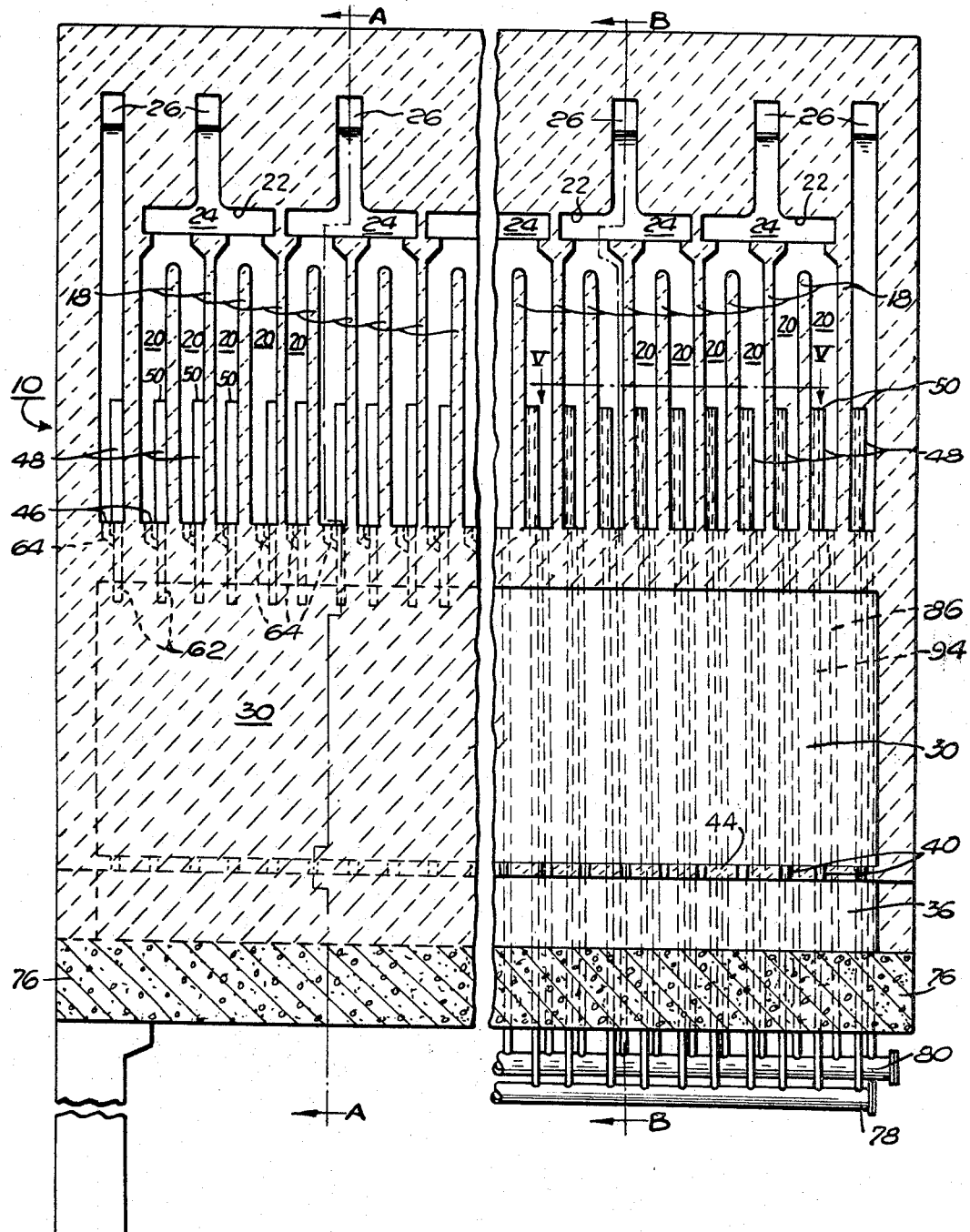
Figure 2:
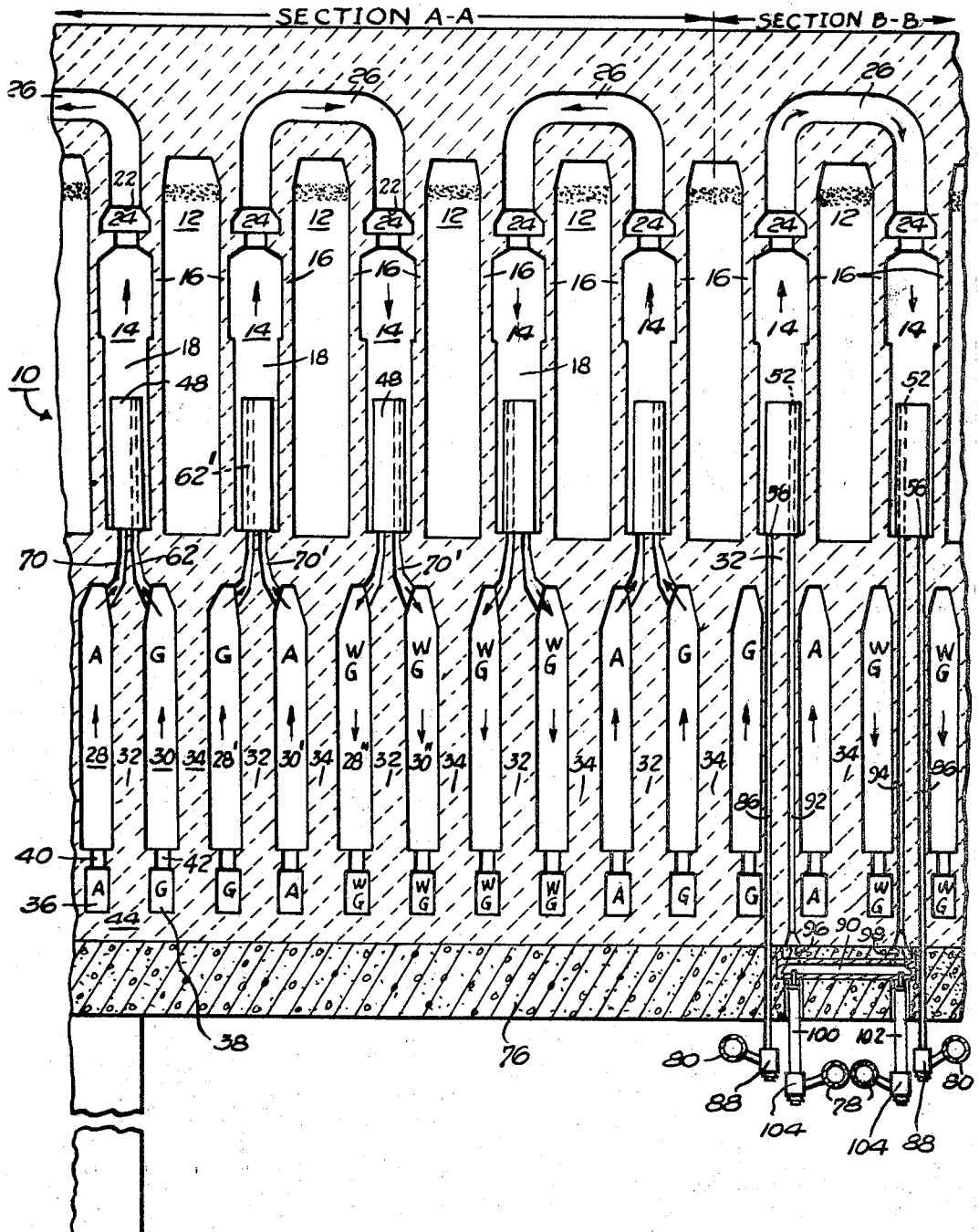

Referring to the drawings and particularly to FIGURES 1 and 2, there is illustrated a coke oven battery generally designated by the numeral 10 that has a plurality of elongated coking chambers 12 extending crosswise thereof. Positioned in alternation with the coking chambers 12 are heating chambers generally designated by the numeral 14. The heating chambers 14 have heating walls 16 adjacent the respective coking chambers 12 and transverse, spaced, vertical partition walls 18 that divide the heating chambers 14 into a plurality of vertical flues 20 (FIGURE 1). Certain of the partition walls 18 are connected to the heating chamber upper horizontal wall 22 and other partition walls have their upper edge portions terminating below the heating chamber upper wall 22. With this arrangement a group of vertical flues 20 are interconnected by means of a horizontal passageway 24 to a crossover flue 26. The crossover flue 26 extends over the coking chamber 12 and connects the groups of flues 20 on the opposite side of the coking chamber 12 (FIGURE 2) so that combustion may take place in one group of flues 20 on one side of the coking chamber and the gaseous products of combustion conveyed through the crossover flue 26 and downwardly through the vertical flues 20 on the opposite side of the coking chamber 12. Heat is thus extracted from the gaseous products of combustion as it flows downwardly through the group of flues 20 on the opposite side of the coking chamber 12. The group of flues on one side of the coking chamber in which combustion of the gas is taking place are called the "on" flues and the interconnected group of flues on the other side of the coking chamber through which gaseous products of combustion are conveyed are called the "off" flues.

Below the flues 20 there are pairs of elongated transversely extending regenerators 28 and 30 associated with each heating chamber 14. Between the regenerators 28 and 30 there are pillar walls 32 that separate the regenerators and serve as structural supports for the heating chambers 14. Between the pairs of regenerators 28 and 30 there are division walls 34 that serve as a structural support for the coking chambers 12 positioned thereabove. Positioned below the regenerators 28 and 30 are pairs of transversely extending sole flues 36 and 38 that are connected to the respective regenerators by means of risers or passageways 40 and 42 in the coke oven brickwork 44. The sole flues 36 and 38 are arranged to conduct either air or lean gas to the respective regenerators 28 and 30 positioned thereabove, as will be later described, and to also conduct waste gas, that is, the gaseous products of combustion, from the regenerators associated with the bank of "off" flues, i.e. the flues that are heated by the gaseous products of combustion flowing through the crossover flue 26 from the bank of flues on the other side of the coking chamber 12. The above described coke oven structure is a brief description of a typical Becker crossover type coke oven battery, and the following arrangements for supplying the rich and lean fuel gas and the air to the "on" flues and withdrawing the products of combustion from the "off" flues are the improvements in the Becker crossover type coke oven battery that provide the advantageous features hereinbefore discussed.

Figure 5:
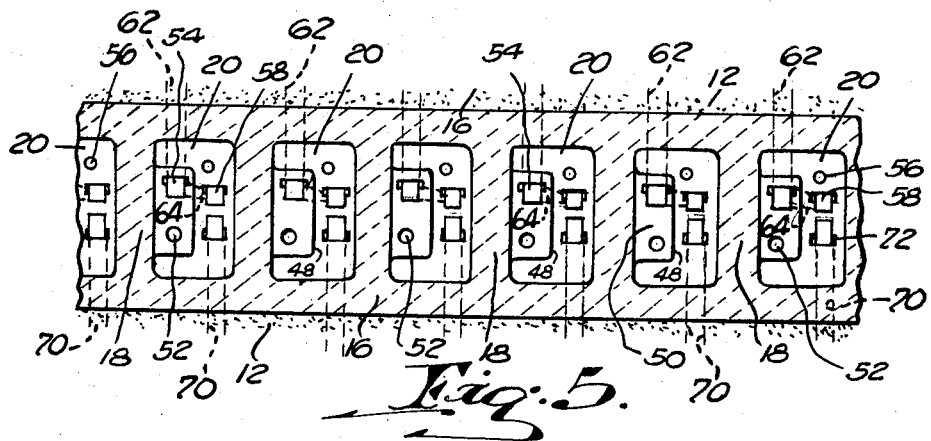
FIGURE 5 is a view in section taken along the line V—V in FIGURE 1 illustrating the plurality of gas and air ports and the means for controlling the flow of lean fuel gas and air into the respective vertical flues.

The vertical flues 20 (FIGURES 1, 5 and 6) have a base or floor portion 46 and the partition walls 18 have a laterally extending protuberance 48 that terminates in an upper horizontal wall 50 spaced a substantial distance above the vertical flue floor or base portion 46. The vertical protuberance 48 has vertical passageways therethrough for rich gas and lean gas or air, as later described. The protuberance top wall 50 has a high level rich gas port 52 (FIGURE 6) and a high level lean gas or air port 54 which will be also referred to as the rich gas high burner and the lean gas high burner respectively since combustion of the respective gas is initiated at the gas port. The vertical flue floor or base portion 46 has a low level rich gas port 56 and a low level lean gas or air port 58 through which rich gas and lean gas are supplied to the respective vertical flues 20 adjacent their base portion 46. For convenience, the gas ports 56 and 58 located in the vertical flue base portion 46 will be referred to as rich gas low level burner 56 and lean gas low level burner 58. There is also provided in the base or floor of each vertical flue 20 an air port 60. The air flowing through port 60 is admixed with the gases supplied through the various gas ports for combustion in the vertical flue 20.

The manner in which the lean gas is supplied to the respective lean gas ports 54 and 58 and air is supplied to the air port 60 and burned in the vertical flues will be first described. Referring to FIGURE 3 there is illustrated diagrammatically the pairs of sole flues 36 and 38 connected to the pairs of regenerators 28 and 30 positioned thereabove and the vertical flues 20 connected to the respective pairs of regenerators. To distinguish the "on" flues from the "off" flues during lean gas burning, the interconnected sole flues, regenerators, vertical flues and conduits associated therewith of one transversely extending flue bank, will be designated by numerals having a single prime ('). The sole flues, regenerators, vertical flues and conduits associated therewith connected by the crossover flues 26 to the transversely extending flue bank designated by the numerals having a single prime (') will be designated by numerals having a double prime ("). The arrows in FIGURE 3 indicate the direction of gas flow and the flues 20' that are being supplied with lean gas and air are the "on" flues. Combustion takes place in the vertical flues 20' and the products of combustion are conveyed through the crossover flue 26 and down through the vertical "off" flues 20" to the regenerators 28" and 30".

To more clearly point out the gases flowing through the respective sole flues and regenerators, the letter designation G in FIGURE 3 is intended to indicate the flow of lean gas in the direction shown by the arrows. The letter A is intended to designate the flow of air through the respective sole flues and regenerators in the direction indicated. The designation WG is intended to indicate the flow of waste gas, that is, the gaseous products of combustion, from the vertical flues through the regenerators to the respective sole flues. It should be noted in FIGURE 3 that regenerators 30 and 28' are being supplied with lean gas through the sole flues 38 and 36' respectively. Air is being supplied to regenerator 30' through sole flue 38' and waste gas is flowing through regenerators 28" and 30" and into sole flues 36" and 38".

Figure 6:
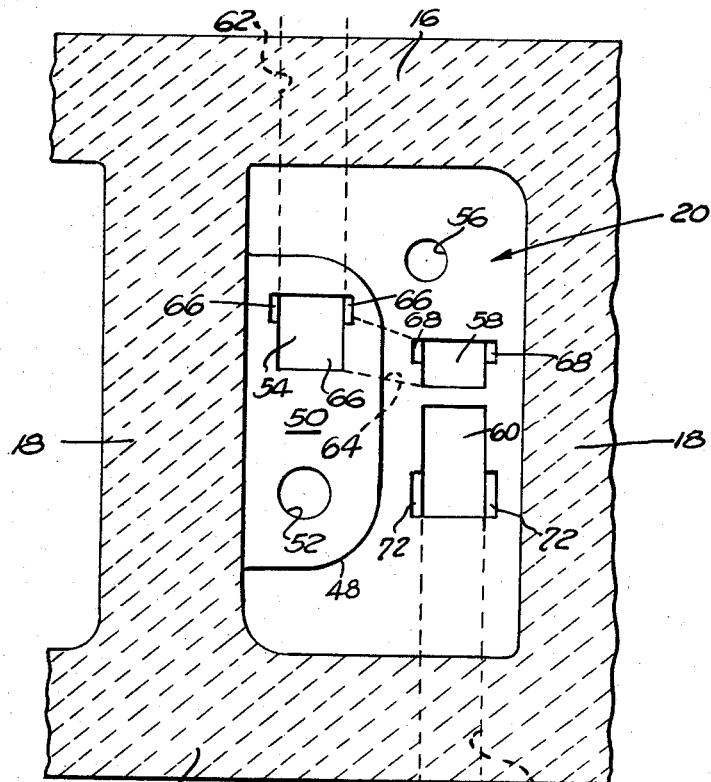
FIGURE 6 is an enlarged view similar to FIGURE 5 of a single vertical flue illustrating in greater detail the respective gas ports and the flow control means for the lean gas and air.

The regenerator 28' has a plurality of vertical riser passages or conduits 62' connecting the regenerator 28' to the vertical flues 20'. The conduit 62' extends upwardly through the base of the flue and through the protuberance to the high level lean gas port 54' so that lean gas flows from regenerator 28' through conduits or vertical riser passages 62' to the high level lean gas port 54'. There is provided a branch conduit 64' that connects the conduit 62' and the low level lean gas port 58'. Thus, lean gas is supplied to the low level lean gas port 58' through branch conduit 64' from the main conduit 62'. Suitable regulating means such as plugs may be positioned in receiver type ledges 66 and 68 to control the volume of lean gas flowing through the respective lean gas ports 54 and 58 (FIGURE 6).

The regenerator 30' is connected by means of a conduit 70' to the air port 60' positioned in the base 46' of the respective vertical flues 20'. With this arrangement all of the air required for combustion is supplied through the air port 60' from the regenerator 30'. It is preferred with lean gas burning that the low level lean gas port 58' be sized to supply about 30% of the fuel at the vertical flue base portion 46'. All of the air for lean gas combustion, however, is supplied through the air port 60'. The lean gas from the low level port 58' burns with a high percentage of excess air. The high level lean gas port 54' preferably should be sized to supply about 70% of the lean gas fuel. The lean gas flowing from the high level lean gas port 54' is admixed with the excess air flowing upwardly from the air port 60' and complete combustion of the lean gas takes place in the vertical flues 20'. The gaseous products of combustion from a group of vertical flues 20' flows through the crossover flue 26 and downwardly through the vertical "off" flues 20" and through the conduits 70", 62" and 64" into the respective regenerators 28" and 30".

Where lean gas is used as the fuel, the regenerator system should be designed so that both the air and lean gas are preheated. The regenerator chambers are so arranged that the lean fuel gas and waste gas are not flowing in adjacent chambers but are separated by a regenerator chamber which conveys air. With this design, the effect of leakage across the high-differential pressure wall is minimized, as the incoming air and lean fuel gas are under substantially the same pressure and traveling in the same direction, and the high-differential-pressure wall is between the incoming air and the outgoing waste gas. Because of this flow arrangement through the regenerators it is necessary, as is illustrated in FIGURE 3, to reverse the relative position of the conduits 62 and 70 and the relative position of the air and lean gas ports 60, 54 and 58 respectively. For example, in FIGURE 3 the vertical flues 20 have the lean gas high level port 54 and lean gas low level port 58 located on the righthand side of the vertical flue 20 as viewed in FIGURE 3 and the ports are supplied by conduits 62 and 64 from the regenerator 30. The air port 60 is located on the lefthand side of the vertical flues 20 and connected by means of conduits 70 to the regenerator 28. The adjacent vertical flues 20', however, have the lean gas ports 54' and 58' located on the lefthand side of the vertical flues 20' as viewed in FIGURE 3 and are supplied with lean gas from regenerator 28' through conduits 62' and 64'. Also, the air ports 60' are located on the right-hand side of the vertical flues 20' and are connected to the regenerator 30' by means of conduits 70'. Sequentially throughout the coke oven battery the relative positions of the lean gas ports and air ports are reversed to provide for the desired flow of air through a regenerator between regenerators conveying lean gas and waste gas, as above described.

Where the coke oven battery 10 is using rich gas alone as the source of fuel, air is supplied through the sole flues to pairs of regenerators connected to the respective vertical flues positioned thereabove by the conduits 62, 64 and 70. For example, in FIGURE 3, assuming the vertical flues 20' were being supplied with rich fuel gas as the heating medium, air would be supplied through both regenerators 28' and 30' to the vertical flues 20'. Air from regenerator 28' would flow through conduits 62' to the high level lean gas port 54' and through branch conduit 64' to low level lean gas port 58'. Air would also flow through conduits 70' from regenerator 38' to the air port 60' in each vertical flue 20'. The air port 60' is also provided with a flow regulating means such as plugs that are positioned on receiver type ledges 72 to control the rate of flow through air port 60'. Thus with this arrangement, the ports 54' and 58' serve a dual function, that is, during lean gas heating the ports 54' and 58' supply lean gas fuel to the respective vertical flues 20. During rich gas heating, the ports 54' and 58' supply air at two levels, i.e., at the high level and at the low level for admixture with the rich gas.

Referring now to FIGURES 1, 2, 4 and 6, the manner by which the rich fuel gas is supplied to the respective high level rich gas port 52 and low level rich gas port 56 will be described. There is provided a gas main 74 (FIGURE 4) which is connected to a suitable supply of rich fuel gas. The rich fuel gas main 74 extends longitudinally along the coke oven battery and has a plurality of spaced supply conduits connected thereto and extending transversely beneath the coke oven floor 76. There is a transverse conduit 78 for each bank of vertical flues 20 that is arranged to supply rich fuel gas to all of the high level rich fuel gas burners 52 in the transveresly extending bank of heating flues 20. There are a plurality of other transversely spaced conduits 80 that are arranged to supply rich fuel gas to the rich gas low level burners 56 in each of the heating flues 20. Thus, for each bank of flues 20 there is a transverse rich gas conduit 78 that supplies rich fuel gas to the high level rich fuel gas ports 52 and a second transverse conduit 80 that supplies rich fuel gas to the low level rich fuel gas ports 56. There is a main air conduit 82 that is positioned preferably parallel to the main rich gas conduit 74. The main air conduit 82 is connected to each of the transverse conduits 80 by a branch conduit 84. There is a suitable three way valve means connecting the transverse conduit 80 to the air conduit 82 and rich gas conduit 74 so that either air or rich gas may be conveyed through the transverse conduit 80 to the low level rich gas burners 56.

As is illustrated in FIGURE 2, section B—B and schematically in FIGURE 4, the transverse conduits 80 are connected to the low level rich gas ports 56 by means of vertical conduits 86 extending vertically through the coke oven floor 76 and through the pillar wall 32. Suitable control and connecting means 88 are provided to connect the vertical conduits 86 with the transverse conduits 80 and to control the flow of either rich gas or air therethrough. Between the pair of transverse conduits 80 there are positioned a pair of transverse conduits 78 that are arranged to supply rich fuel gas to the pair of high level gas ports 52 in adjaecnt vertical flues 20. The coke oven floor 76 has a transverse passageway 90 therethrough which is connected to a pair of vertical conduits 92 and 94. The conduits 92 and 94 adjacent their connection to the transverse conduit 90 have orifice portions 96 and 98. The transverse passageway 90 has a pair of conduits 100 and 102 connected thereto in substantially axial alignment with the vertical conduits 92 and 94. Orifice means are provided in the conduits 100 and 102 to control the flow of rich gas therethrough and aspirate a portion of the waste gas entering the transverse passageway 90. Suitable connecting and control means 104 connect the transverse conduits 78 with the respective vertical conduits 100 and 102 to control the flow of rich gas therethrough. With the above arrangement, a portion of the waste gas, i.e., the products of combustion, enters the vertical conduit 94 through the high level gas port 52 and flows downwardly into the transverse passageway 90. The waste gas is admixed with the rich fuel gas fed through the conduit 100 into the vertical conduit 92 to thus dilute the rich gas flowing upwardly through conduit 92 to prevent the deposition of a carbonaceous residuum in the conduit 92 because of the high temperature to which the rich gas is subjected.

It should be noted that the relative positions of the high level and low level rich gas ports 52 and 56 and the conduits connected thereto are reversed in adjacent vertical heating flues to permit the admixture of waste gas with the rich fuel gas that is supplied to the high level burner. In addition, to prevent the accumulation of carbonaceous residuum in the low level gas port in the "off" flue, air under pressure is supplied from the main air conduit 82 through the valve means 84 to the respective transverse conduit 80 connected to the low level rich gas ports by means of vertical conduits 86. Thus, in the "off" flue, air flows upwardly through the low level rich gas port to prevent the accumulation of a carbonaceous residuum thereon.

Conduits 62, 64 and 70 have been illustrated in FIGURE 4 connecting the regenerators 28 and 30 on the lefthand side of the drawing to the vertical heating flues 20 positioned thereabove to illustrate the manner in which air is supplied to the respective flues 20. Air is supplied from regenerator 28 through conduits 70 to the air port 60 located in the base of the vertical flues 20 where it is admixed with the rich fuel gas flowing through conduit 86 through low level rich gas port 56 for admixing and combustion at the base of the flue 20. Air is conveyed from regenerator 30 through conduit 62 to the high level lean gas port 54 where it is admixed with the rich fuel gas supplied through vertical conduit 94 to the rich fuel gas high level port 52. Air is also conveyed through branch conduits 64 and the low level lean gas port 58. With this arrangement when rich fuel gas is the heating fuel, the rich fuel gas supplied to the low level rich fuel gas port is admixed with air at that location and is burned adjacent the base of the flue. At the higher level, rich fuel gas is supplied through the high level rich fuel gas port 52 and is admixed with air supplied through the high level lean gas port 54 and is admixed therewith and burned at that location. Therefore, two stage combustion of the rich fuel gas takes place by simultaneous burning of the rich fuel gas at the low level burners 56, 58 and at the high level burners 52, 54. Plug type control means may be positioned on receiver ledges 66, 68 and 72 to control the volume of air supplied through the respective ports 54, 58 and 60. It should be understood that other types of flow control means such as slider bricks or the like may be used to control the flow of gas through the respective ports.

Where lean fuel gas is the principal heating fuel and an incremental increase in flue temperature is desired, metered quantities of rich fuel gas may be supplied through the separate rich fuel gas supply system previously discussed to either or both the low level rich fuel gas port 56 or the high level rich fuel gas port 52.

It is apparent with the above described two stage heating system that it is now possible to utilize either preheated lean fuel gas or rich fuel gas as the gaseous fuel for burning simultaneously in a two stage heating system, that is, the lean gas or rich gas may be supplied and burned simultaneously at the low level burners and the high level burners. In addition, where an increased flue temperature is desired during burning with lean gas as the principal fuel, metered quantities of rich fuel gas may be supplied to either the rich gas low level gas port or the rich gas high level gas port for admixture and combustion with the lean fuel gas.

According to the provisions of the patent statutes, I have explained the principle, preferred construction, and mode of operation of my invention and have illustrated and described what I now consider to represent its best embodiments. However, I desire to have it understood that, within the scope of the appended claims, the invention may be practiced otherwise than as specifically illustrated and described.

I claim:
1. In a horizontal coke oven battery the combination comprising,
   an elongated coke oven chamber,
   a pair of elongated spaced heating chambers positioned on opposite sides of said coke oven chamber,
   each of said heating chambers comprising a pair of spaced apart heating walls and a plurality of spaced transversely extending dividing walls forming a plurality of vertically extending elongated heating flues,
   each of said flues having a bottom wall,
   first means for introducing rich gas into said flue adjacent said bottom wall,
   second separate means for introducing rich gas into said flue at an elevated location relative to said bottom wall,
   third separate means for introducing air or lean gas into said flue at said elevated location and spaced horizontally from said last named means for introducing rich gas into said flue,
   fourth means for introducing air or lean gas into said flue adjacent said bottom wall,
   fifth separate means spaced horizontally from said first means for introducing air into said flue adjacent said bottom wall,
   said first and fifth means arranged to supply rich gas and air respectively to said flue for admixture and combustion at a location adjacent said flue bottom wall,
   said second and third means arranged to supply rich gas and air respectively to said flue for admixture and combustion at an elevated location relative to said flue bottom wall,
   said fourth means arranged to supply lean gas to said flue at a location adjacent said flue bottom wall for admixture with air supplied through said fifth means for combustion adjacent said bottom wall, and
   said third means arranged to supply lean gas into said flue at said elevated location for admixture with excess air supplied through said fifth means for combustion at said elevated location.

2. In a horizontal coke oven battery as set forth in claim 1 which includes,
   conduit means connecting said fourth means to said third means below said flue bottom wall so that air or lean gas is supplied simultaneously to said flue from said third means and said fourth means.

3. In a horizontal coke oven battery as set forth in claim 1 which includes,
   means within said respective flue to control the amount of gas supplied to said flue through said third, fourth and fifth means.

4. In a horizontal coke oven battery as set forth in claim 1 which includes,
   a pair of regenerator chambers positioned beneath and associated with said heating chambers,
   conduit means connecting one of said regenerator chambers with said third means in each of said flues in said heating chamber to convey lean gas from said regenerator to each of said flues at said elevated location in said flues,
   branch conduit means connecting said conduit means to said fourth means below said flue bottom wall to convey lean gas from said first named conduit means to each of said flues at a location adjacent said flue bottom wall, and other conduit means connecting the other regenerator chamber with said fifth means in each of said flues to supply air from said other regenerator chamber to each of said flues at a location adjacent said flue bottom wall.

5. In a horizontal coke oven battery as set forth in claim 1 which includes,
   pairs of regenerator chambers positioned beneath and associated with said heating chambers,
   a first rich gas supply conduit positioned below each of said heating chambers,
   a second rich gas supply conduit positioned below each of said heating chambers,
   a plurality of vertical conduits connecting said first rich gas supply conduit and said first means in each of said flues in said heating chamber to supply rich gas to each of said flues at a location adjacent said bottom wall,
   a second plurality of vertical conduits connecting said second rich gas supply conduit and said second means in each of said flues in said heating chamber to supply rich gas to each of said flues at said elevated location in said flues,
   conduit means connecting one of said regenerator chambers with said third means in each of said flues in said heating chamber to convey air from said regenerator chamber to each of said flues at said elevated location, and
   other conduit means connecting the other regenerator chamber with said fifth means in each of said flues to supply air from said other regenerator chamber to each of said flues at a location adjacent said flue bottom wall.

6. In a horizontal coke oven battery as set forth in claim 1 which includes,
   crossover ducts connecting said heating chambers on opposite sides of said coke oven so that the gaseous products of combustion from one heating chamber flows downwardly through the other heating chamber,
   conduit means connecting said second means below said heating chamber so that a portion of said gaseous products of combustion flowing downwardly through one heating chamber is admixed with the rich gas introduced into the flues in the other heating chamber at an elevated location relative to the flue bottom wall.

7. In a horizontal coke oven battery as set forth in claim 1 which includes,
   crossover ducts connecting said heating chambers on opposite sides of said coke oven so that the gaseous products of combustion from one heating chamber flows downwardly through the other heating chamber, and
   means to supply air to said first means in said other heating chamber while said gaseous products of combustion are flowing downwardly through said other heating chamber.

8. In a horizontal coke oven battery as set forth in claim 1 which includes,
   crossover ducts connecting said heating chambers on opposite sides of said coke oven so that the gaseous products of combustion from one heating chamber flows downwardly through the other heating chamber,
   a pair of regenerator chambers positioned beneath and associated with each of said heating chambers,
   conduit means connecting one of said pair of regenerator chambers with said third means in each of said flues in each of said heating chambers positioned thereabove to convey lean gas from one of said regenerator chambers to each of said flues of one of said heating chambers at said elevated location in said flues and to convey a portion of the gaseous products of combustion from the flues in the other heating chamber to one of said regenerator chambers positioned therebelow,
   branch conduit means connecting said conduit means to said fourth conduit means below said heating chambers to convey lean gas from first named conduit means to each of said flues of one of said heating chambers at a location adjacent said flue bottom wall and to convey a portion of the gaseous products of combustion from the flues in the other heating chamber to one of said regenerators positioned therebelow,
   other conduit means connecting the other regenerator chamber of said pair with said fifth means in each of said flues in each of said heating chambers positioned thereabove to convey air from said other regenerator chamber to each of said flues in one of said heating chambers and to convey a portion of the gaseous products of combustion from the flues in the other heating chamber to one of said regenerators positioned therebelow.

9. In a horizontal coke oven battery as set forth in claim 8 which includes,
   means to concurrently supply rich fuel gas to said flues of said heating chambers into which lean gas is being introduced to thereby increase the temperature of the respective flue.

References Cited

UNITED STATES PATENTS

| 1,967,975 | 7/1934 | Schaefer | 202—135 |
| 3,304,240 | 2/1967 | Van Ackeren | 202—141 |
| 3,345,051 | 10/1967 | Van Ackeren | 202—135 |
| 3,366,372 | 1/1968 | Palumbo | 202—143 |
| 3,373,087 | 3/1968 | Van Ackeren | 202—135 |

FOREIGN PATENTS 577,126  6/1959  Canada.

WILBUR L. BASCOMB, Jr., Primary Examiner.

U.S. Cl. X.R.

202—144.